(12) United States Patent
Tai et al.

(10) Patent No.: US 7,290,903 B2
(45) Date of Patent: Nov. 6, 2007

(54) PROJECTION DISPLAY

(75) Inventors: Wen-Chih Tai, Taipei Hsien (TW);
Shih-Tsung Yang, Taipei Hsien (TW);
Chia-Lin Liu, Tai-Chung Hsien (TW);
Chi-Neng Mo, Tao-Yuan Hsien (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 85 days.

(21) Appl. No.: 11/163,639

(22) Filed: Oct. 26, 2005

(65) Prior Publication Data

US 2007/0091621 A1 Apr. 26, 2007

(51) Int. Cl.
*F21V 29/00* (2006.01)

(52) U.S. Cl. ............... 362/373; 362/276; 315/159

(58) Field of Classification Search ............... 362/295, 362/373, 276, 301; 40/570; 315/149, 159
See application file for complete search history.

(56) References Cited

U.S. PATENT DOCUMENTS 5,276,599 A * 1/1994 Neeley ................... 362/301
5,446,440 A * 8/1995 Gleason et al. ............. 340/331
5,497,573 A * 3/1996 Stadjuhar et al. ............ 40/564
6,081,902 A 6/2000 Cho
6,388,388 B1 5/2002 Weindorf et al.
6,704,061 B2 3/2004 Mears et al.
2003/0103345 A1* 6/2003 Nolan ....................... 362/157

FOREIGN PATENT DOCUMENTS

JP 10-197952 7/1998
JP 11-133505 5/1999

* cited by examiner

*Primary Examiner*—John Anthony Ward
(74) *Attorney, Agent, or Firm*—Winston Hsu

(57) ABSTRACT

A projection display includes a housing, a display panel, a power plug for electrically connecting to an external power source and receiving power provided by the external power source, a light source electrically connected to the power plug for emitting light onto the display panel when receiving power from the power plug, a heat-ventilating device for ventilating heat generated by the light source to a region outside of the housing, a power storage device for storing power, and a power detector electrically connected to the heat-ventilating device, the power storage device, and the power plug for selectively electrically connecting the heat-ventilating device either to the power plug or to the power storage device.

12 Claims, 5 Drawing Sheets

US 7,290,903 B2

PROJECTION DISPLAY

BACKGROUND OF THE INVENTION

1. Field of the Invention

The present invention relates to a projection display, and more particularly, to a projection display which can be self-powered or can be externally powered.

2. Description of the Prior Art

In a projection display, how to prolong the lifespan of a light bulb is of primary concern. The quality of a heat-ventilating device is one of the most crucial factors affecting the lifespan of the light bulb.

Since light bulbs generate heat, even for a time after a light bulb is turned off, prior art projector heat-ventilating devices do not stop functioning when the light bulb is turned off. Instead, the heat-ventilating device still functions for a certain period of time to ventilate the heat generated by the light bulb as completely as possible, and to protect the light bulb from heat damage.

For example, U.S. Pat. No. 6,704,061 entitled "Temporary Simulated Off State in a Restart of a Video Display" to Gilmore et al. teaches a two-stage management flow chart to control the operation of a heat-ventilating device. In operation, when a user presses a power off key, a display panel performs a pseudo power-off operation, that is, the display panel stops displaying images during a first time period beginning at a moment when the power off key is pressed, to inform the user that the power off key is pressed. During the first time period, the light bulb is still fully shining. If any key is pressed during the first time period, indicating that the press of the power off key was in error, the display panel re-displays images under a circumstance that the light bulb need not be re-actuated (the above is a first stage). On the contrary, if during the first time period no key is pressed, indicating that the user means to power off the projection display, the management flow chart enters a second stage. During the second stage, the management flow chart ignores any key press, that is, the management flow chart dumps any key signals. During the second stage, the light bulb's energy dies off, while the heat-ventilating device does not stop functioning until the end of the second stage.

The above-described management flow chart of controlling the heat-ventilating device after the power off key is pressed does not end until the end of the second stage, so as to cool off the light bulb as completely as possible. However, the management flow chart is not able to handle a situation in which the projection display is suddenly deprived of power. In the case of a sudden power outage, the heat-ventilating device stops the heat-ventilating operation, and the light bulb can be easily damaged by the heat remaining in the projection display.

SUMMARY OF THE INVENTION

It is therefore a primary objective of the claimed invention to provide a projection display that has a heat-ventilating device able to function without power provided by an external power source, so as to overcome the above-mentioned problems.

The projection display includes a housing, a display panel installed on the housing, a power plug installed outside the housing for electrically connecting to an external power source for receiving power provided by the external power source, a light source installed in the housing and electrically connected to the power plug for emitting light onto the display panel when receiving power from the power plug, a heat-ventilating device installed in the housing for ventilating heat generated by the power source to a region outside of the housing when receiving power, a power storage device for storing power, and a power detector electrically connected to the heat-ventilating device, the power storage device, and the power plug for selectively electrically connecting the heat-ventilating device either to the power plug or to the power storage device according to a voltage level of the power plug.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
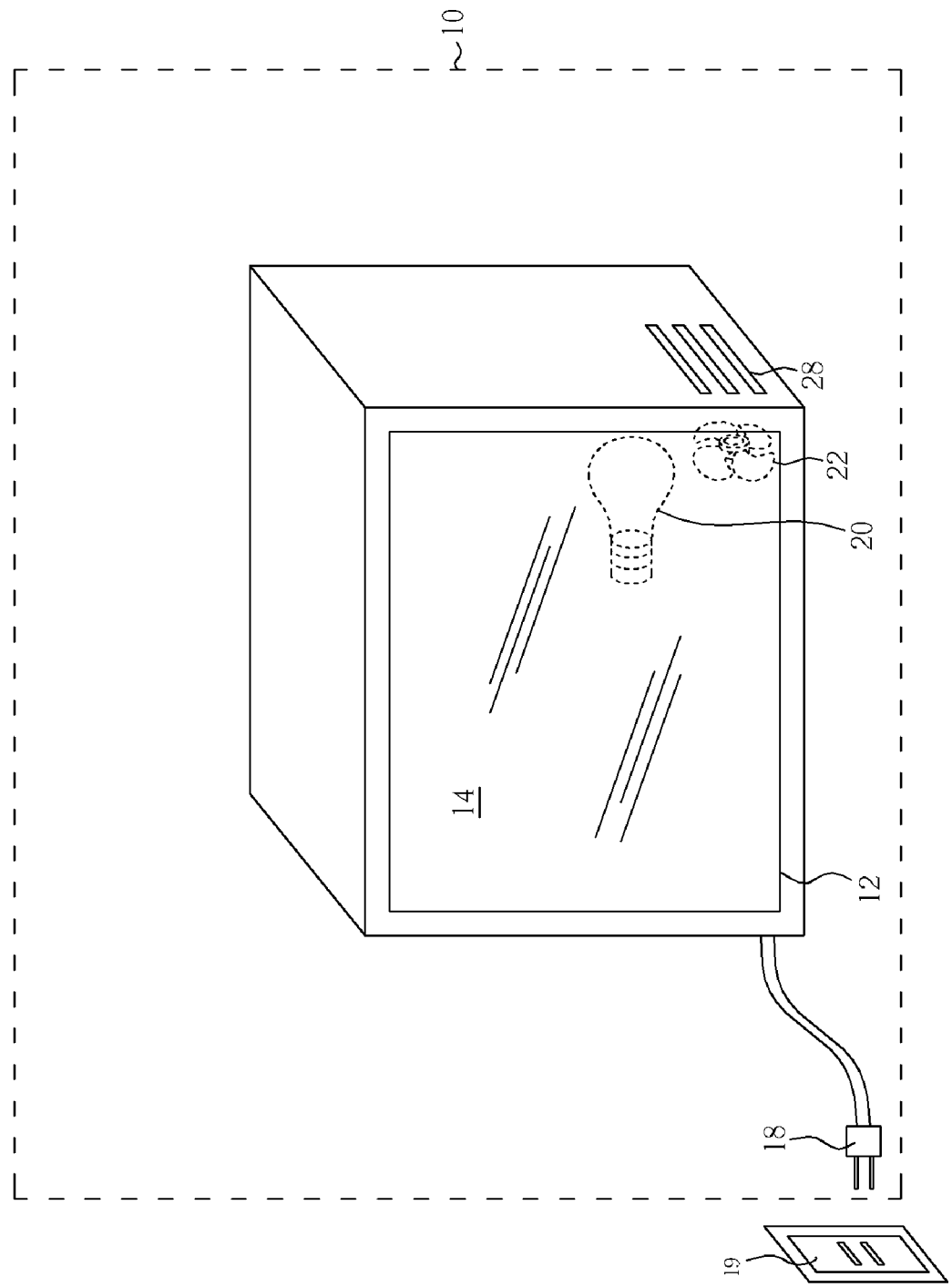
FIG. 1 is a schematic diagram of a projection display of a first embodiment according to the present invention.
Figure 2:
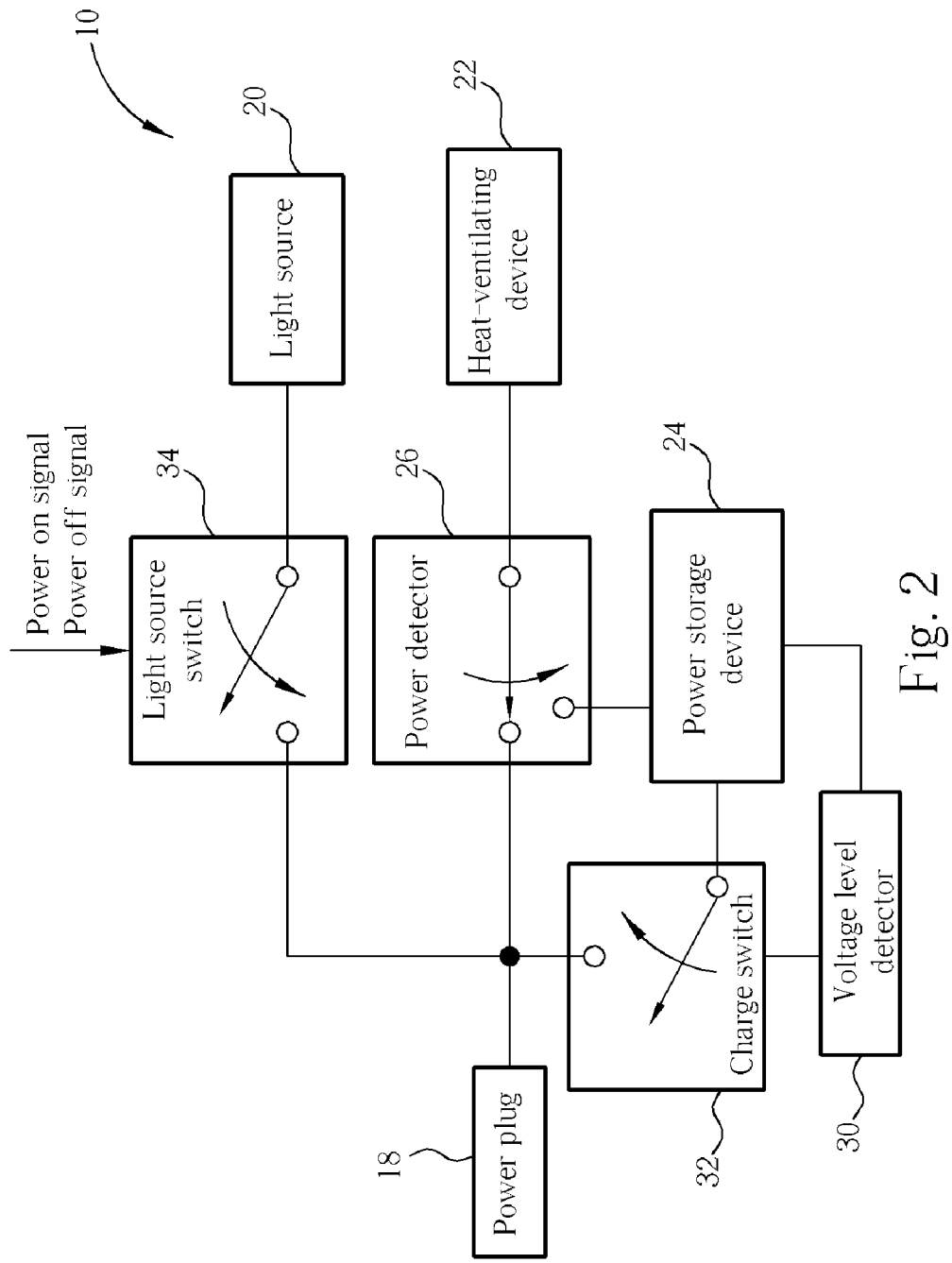
FIG. 2 is a functional block diagram of the projection display shown in FIG. 1

Please refer to FIG. 1 and FIG. 2. FIG. 1 is a schematic diagram of a projection display 10 of a first embodiment according to the present invention. FIG. 2 is a functional block diagram of the projection display 10. The projection display 10 comprises a housing 12, a display panel 14, a power plug 18, a light source 20, a heat-ventilating device 22, a power storage device 24, a power detector 26, a voltage level detector 30, a charge switch 32, and a light source switch 34. The housing 12 comprises a plurality of heat-ventilating holes 28.

The display panel 14 is installed on the housing 12. The power plug 18 is installed outside the housing 12 for electrically connecting to an external power source (not shown) and receiving power provided by the external power source. The light source switch 34 is electrically connected to the power plug 18 for transferring the power received by the power plug 18 to the light source 20 after receiving a power-on signal emitted by a remote control. The remote control can further emit a power-off signal. The light source 20 is installed in the housing 12 and is electrically connected to the light source switch 34 for emitting and projecting light onto the display panel 14 when receiving power from the light source switch 34. The heat-ventilating device 22 is installed in the housing 12 for ventilating heat generated by the light source 28 to a region outside of the housing 12 via the heat-ventilating holes 28 when receiving power. The power detector 26 is electrically connected to the heat-ventilating device 22, the power storage device 24, and power plug 18 for selectively electrically connecting the heat-ventilating device 22 either to the power plug 18 or to the power storage device 24 according to a voltage level of the power plug 18 (that is according to whether the power plug 18 receives power provided by the external power source). For example, when detecting that the power plug 18 receives power provided by the external power source, the power detector 26 electrically connects the heat-ventilating device 22 to the power plug 18 to enable the heat-ventilating device 22 to rely on the power received by the power plug 18 to operate. On the contrary, when detecting that the power plug 18 does not receive power provided by the external power source, the power detector 26 electrically connects the heat-ventilating device 22 to the power storage device 24 to enable the heat-ventilating device 22 instead to rely on the power stored in the power storage device 24 to operate. The voltage level detector 30 is electrically connected to the power storage device 24 for detecting a voltage level of the power storage device 24. The charge switch 32 is controlled by the voltage level detector 30 for electrically connecting the power storage device 24 to the power plug 18 when the voltage level of the power storage device 24 is detected to be lower than a predetermined voltage level. Then, power received by the power plug 18 continues to flow into the power storage device 24 until the voltage level of the power storage device 24 is not lower than the predetermined voltage level.

In the first embodiment, the light source 20 is a light bulb, the heat-ventilating device 22 is a fan, the power detector 26 is a relay, and the power storage device 24 comprises a capacitor and/or a rechargeable battery.

Figure 3:
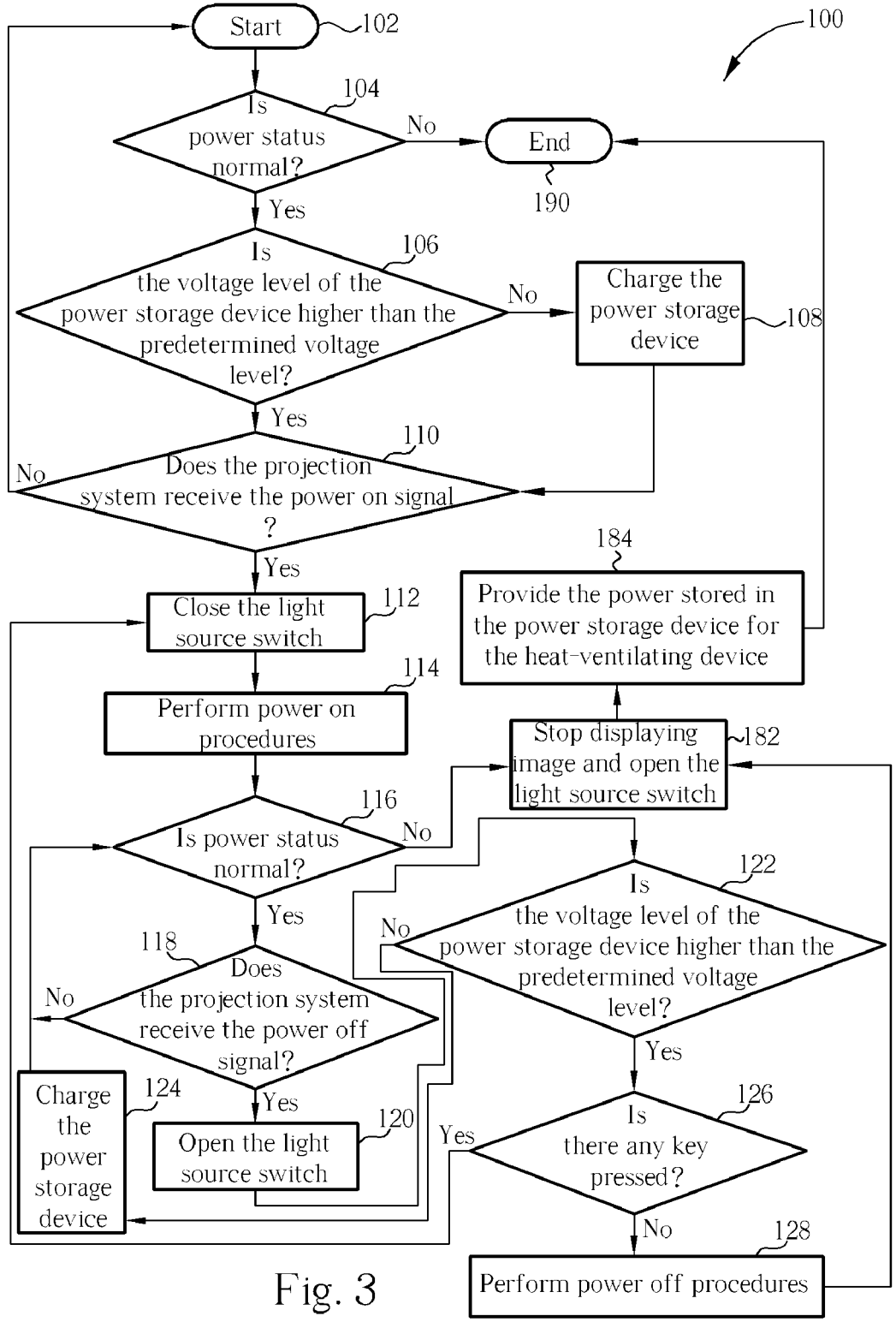
FIG. 3 is a flow chart of an operation process of the projection display shown in FIG. 1.

Please refer to FIG. 3, which is a flow chart of an operation process 100 of the projection display 10. The operation process 100 comprises the following steps:

step 102: Start;

step 104: Does the projection display 10 have a normal power status? If it does, go to step 106, otherwise go to step 190;

(The power detector 26, through detecting if the power plug 18 receives power provided by the external power source, determines if the power status of the projection display 10 is normal. In practice, if the power plug 18 receives the power provided by the external power source, the projection display 10 is determined to have a normal power status.)

step 106: Is the voltage level of the power storage device 24 higher than the predetermined voltage level? If it is, go to step 110, otherwise go to step 108;

(The voltage level detector 30 is capable of determining if the voltage level of the power storage device 24 is higher than the predetermined voltage level, and determining if the power storage device 24 needs to be charged.)

step 108: Charge the power storage device 24, and go to step 110;

(Thus far, the operation process 100 determines that the power storage device 24 does not have enough stored power. Then, the voltage level detector 30 sets the charge switch 32 to enable the power received by the power plug 18 to be transferred to and stored in the power storage device 24.)

step 110: Does the projection display 10 receive the power signal? If it does, go to step 112, otherwise go to step 102;

step 112: Set the light source switch 34, and go to step 114;

(Therefore, the light source 20 is able to receive the power received by the power plug 18, and emit light onto the display panel 14.)

step 114: Perform power on procedures of the projection display 10, and go to step 116;

step 116: Does the projection display 10 have the normal status? If it does, go to step 118, otherwise go to step 182;

(The operation process 100 has to check from time to time if the power status of the projection display 10 is normal.)

step 118: Does the projection display 10 receive the power off signal? If it does, go to step 120, otherwise go to step 116;

(Under the premise that the projection display 10 has the normal power status, the operation process 100 detects continuously if the projection display 10 receives the power off signal emitted by the remote control.)

step 120: Stop displaying images, and go to step 122;

(After receiving the power off signal, the projection display 10 stops displaying any images.)

step 122: Is the voltage level of the power storage device 24 higher than the predetermined voltage level? If it is, go to step 126, otherwise go to step 124;

(Before turning off the projection display 10, the voltage level detector 30 determines again if the voltage level of the power storage device 24 is higher than the predetermined voltage level, so as to guarantee that the power stored in the power storage device 24 is enough for the heat-ventilating device 22 to operate, that is ventilating the heat generated by the light source 20 to the region outside of the housing 12.)

step 124: Charge the power storage device 24 (similar to step 108), and go to step 116;

step 126: Is there any key pressed? If there is, go to step 112, otherwise go to step 128;

(Step 126 is similar to the prior art and detailed description is hereby omitted.)

step 128: Perform power-off procedures of the projection display 10, go to step 182;

step 182: Stop displaying images and set the light source switch 34 (during this time, the power status of the projection display 10 is abnormal);

step 184: Supply the heat-ventilating device 22 with the power stored in the power storage device 24; and (The power detector 26 electrically connects the heat-ventilating device 22 to the power storage device 24, so that the heat-ventilating device 22 can still function, even if the power status of the projection display 10 is abnormal, for example, when powered off suddenly, to protect the light source 20 from heat damage.)

step 190: End.

Figure 4:
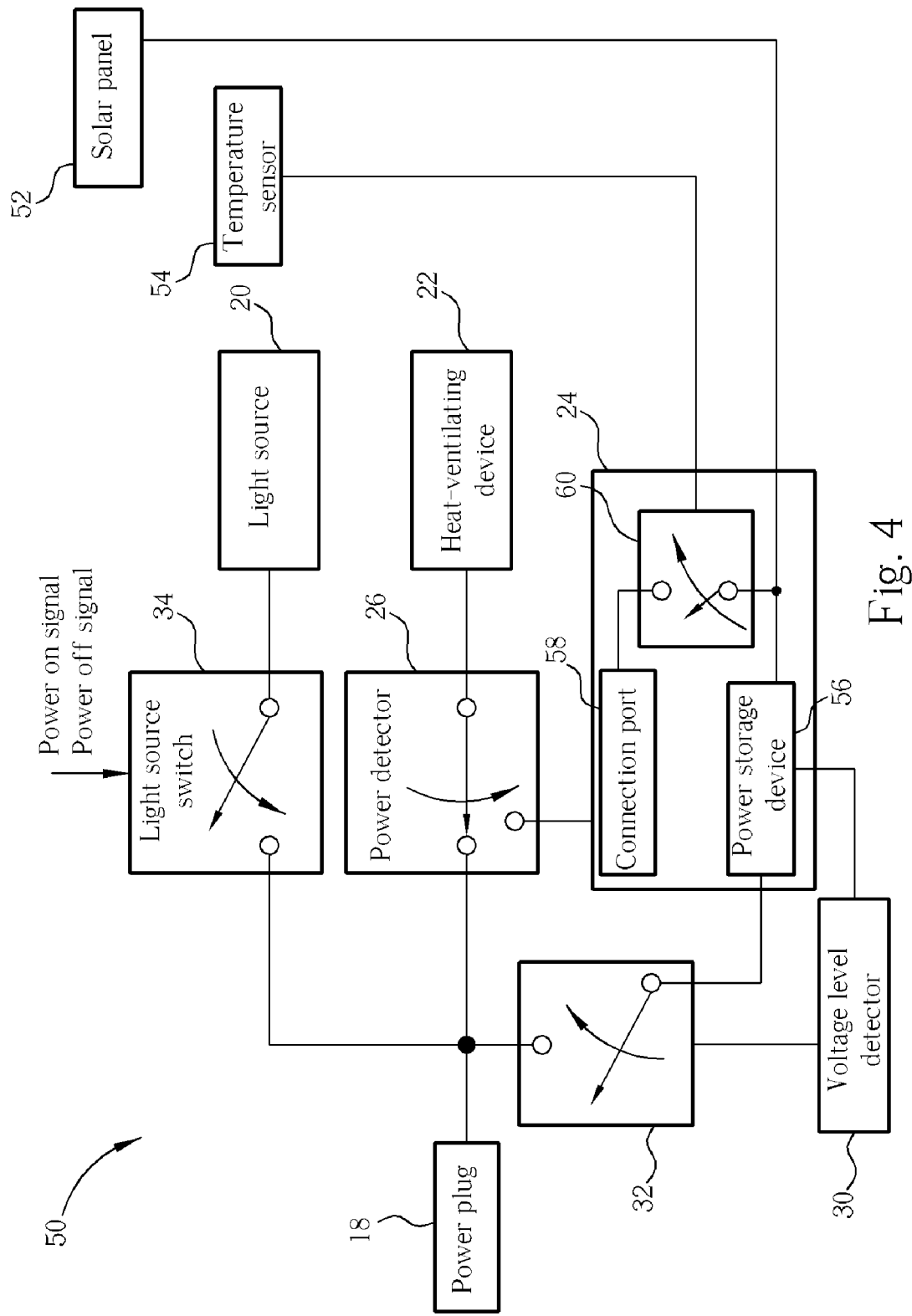
FIG. 4 is a functional block diagram of a projection display driver of a second embodiment according to the present invention.

Please refer to FIG. 4, which is a functional block diagram of a projection display driver 50 of a second embodiment according to the present invention. In addition to the housing 12, the display panel 14, the power plug 18, the light source 20, the heat-ventilating device 22, the power storage device 24, the power detector 26, the voltage level detector 30, the charge switch 32, the light source switch 34, and the heat-ventilating holes 28, the projection display driver 50 further comprises a solar panel 52, and a temperature sensor 54, both of which are installed near the light source 20. The solar panel 52 is electrically connected to the power storage device 24 for transforming the light emitted by the light source 20 into electric power, and storing the electric power into the power storage device 24. The temperature sensor 54 is installed to sense a temperature of the light source 20.

In the projection display driver 50, accordingly, the power storage device 24 comprises a power storage unit 56 for storing power, a connection port 58 electrically connected to the power detector 26, and a discharge switch 60 controlled by the temperature sensor 54 for electrically connecting the power storage unit 56 to the connection port 56 when the temperature of the light source 20 is higher than a predetermined temperature. Therefore, when the light source 20 is not very hot, that is the heat generated by the light source 20 does cause damage, the power storage device 24 does not provide power to the heat-ventilating device 22, and, accordingly, the heat-ventilating device 22 does not consume power. On the contrary, when the temperature sensor 54 senses that the temperature of the light source 20 is very high and is higher than the predetermined temperature, the discharge switch 60 is set, the power storage device 24 therefore provides power to the heat-ventilating device 22, and the heat-ventilating device 22 ventilates heat generated by the light source 20 to the region outside of the housing 12.

Figure 5:
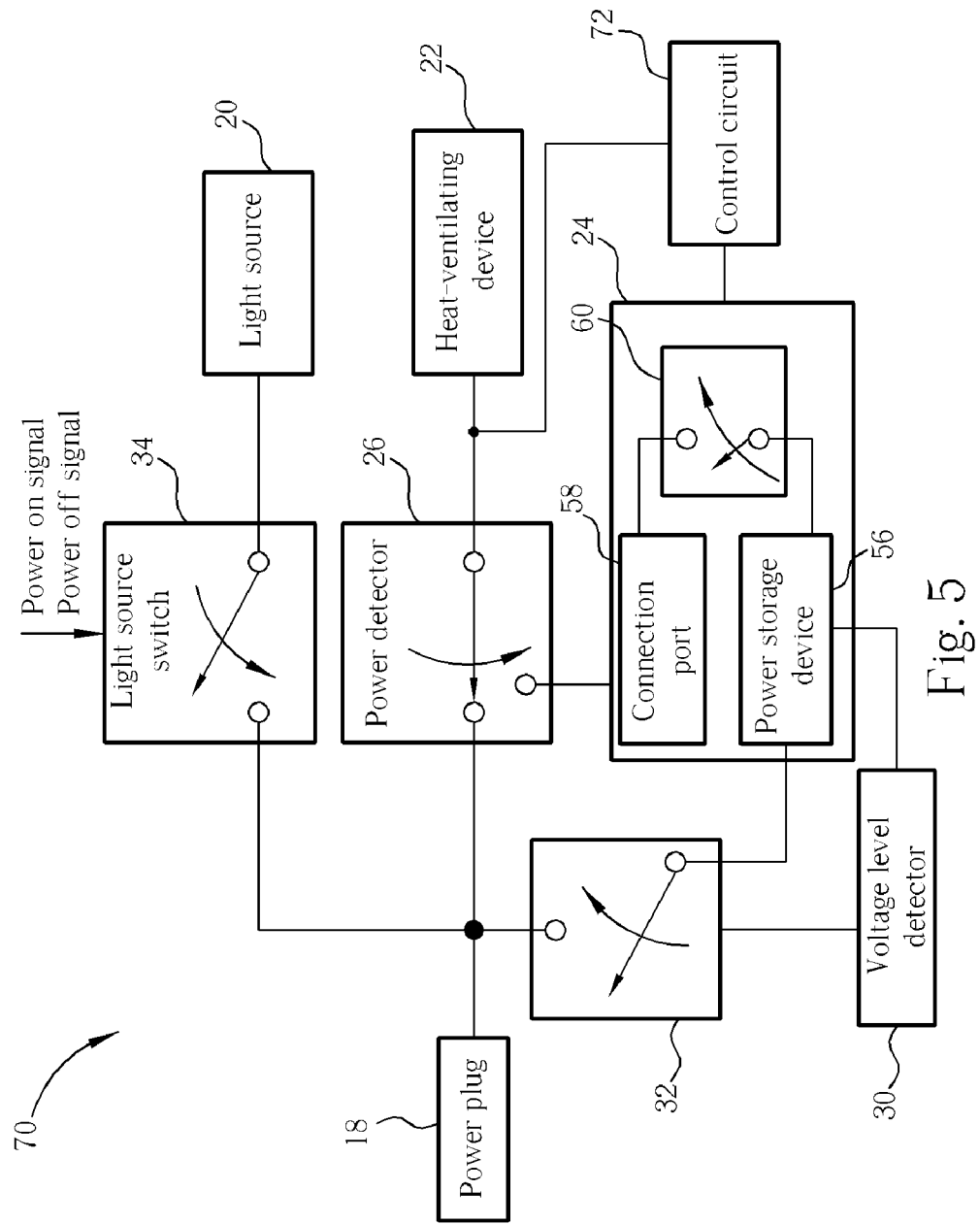
FIG. 5 is a functional block diagram of a projection display driver of a third embodiment according to the present invention.

Please refer to FIG. 5, which is a functional block diagram of a projection display driver 70 of a third embodiment according to the present invention. In addition to the housing 12, the display panel 14, the power plug 18, the light source 20, the heat-ventilating device 22, the power storage device 24, the power detector 26, the voltage level detector 30, the charge switch 32, the light source switch 34, and the heat-ventilating holes 28, and the power storage device 24 having the power storage unit 56, the connection port 58, and the discharge switch 60, the projection display driver 70 further comprises a controlling circuit 72 electrically connected to the power detector 26 for controlling the discharge switch 60 to conduct for a predetermined period of time when the power detector 26 electrically connects the heat-ventilating device 22 to the power storage device 24.

In contrast to the prior art, the projection display 10 and the projection displays 50, 70 include the power storage device 24. Therefore, even if the projection display 10, or the projection display 50 or 70 is deprived of power suddenly, the heat-ventilating device 22 can still function normally by consuming the power stored in the power storage device 24. This allows ventilation of heat generated by the light source 20 via the heat-ventilating holes 28 to the region outside of the housing 12, so as to protect the light source 20 from heat damage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projection display comprising:
   a housing;
   a display panel installed on the housing;
   a power plug installed outside the housing for electrically connecting to an external power source for receiving power provided by the external power source;
   a light source installed in the housing and electrically connected to the power plug for emitting light onto the display panel when receiving power from the power plug;
   a heat-ventilating device installed in the housing for ventilating heat generated by the power source to a region outside of the housing when receiving power;
   a power storage device for storing power;
   a power detector electrically connected to the heat-ventilating device, the power storage device, and the power plug for selectively electrically connecting the heat-ventilating device either to the power plug or to the power storage device according to a voltage level of the power; and
   a light source switch for turning off the light source before the heat-ventilating device is connected to the power storage device, for providing power stored in the power storage device to the heat-ventilating device while the light source is turned off.

2. The projection display of claim 1, wherein the power detector is a relay.

3. The projection display of claim 1, wherein the power storage device comprises a capacitor.

4. The projection display of claim 1, wherein the power storage device comprises a rechargeable battery.

5. The projection display of claim 1 further comprising:
   a voltage level detector electrically connected to the power storage device for detecting a voltage level of the power storage device; and
   a charge switch controlled by the voltage level detector for electrically connecting the power storage device to the power plug when the voltage level of the power storage device is lower than a predetermined voltage level.

6. The projection display of claim 1 further comprising:
   a solar panel installed near the light source and electrically connected to the power storage device for transforming the light emitted by the light source into power, and storing the transformed power into the power storage device.

7. The projection display of claim 1 further comprising:
   a temperature sensor installed near the light source for sensing a temperature of the light source;
   wherein the power storage device comprises:
   a power storage unit for storing power;
   a connection port electrically connected to the power detector; and
   a discharge switch controlled by the temperature sensor for electrically connecting the power storage unit to the connection port when the temperature of the light source is higher than a predetermined temperature.

8. The projection display of claim 7, wherein the power storage unit comprises a capacitor.

9. The projection display of claim 7, wherein the power storage unit comprises a rechargeable battery.

10. The projection display of claim 1, wherein the power storage device comprises:
    a power storage unit for storing power;
    a connection port electrically connected to the power detector; and
    a discharge switch for selectively electrically connecting the power storage unit electrically connected to the connection port;
    wherein the projection display further comprises a controlling circuit electrically connected to the power detector for controlling the discharge switch to electrically connect the power storage unit to the connection port for a predetermined period of time when the power detector electrically connects the heat-ventilating device electrically connected to the power storage device.

11. The projection display of claim 10, wherein the power storage unit comprises a capacitor.

12. The projection display of claim 10, wherein the power storage unit comprises a rechargeable battery.

* * * * *